(12) United States Patent
Schmidt et al.

(10) Patent No.: US 11,592,058 B2
(45) Date of Patent: Feb. 28, 2023

(54) GANTRY ASSEMBLY BEARING WITH VIBRATION DAMPING

(71) Applicant: AKTIEBOLAGET SKF, Gothenburg (SE)

(72) Inventors: William D. Schmidt, Muskegon, MI (US); Parveen K. Chandila, Tomball, TX (US)

(73) Assignee: AKTIEBOLAGET SKF, Gothenburg (SE)

( * ) Notice: Subject to any disclaimer, the term of this patent is extended or adjusted under 35 U.S.C. 154(b) by 142 days.

(21) Appl. No.: 17/144,263

(22) Filed: Jan. 8, 2021

(65) Prior Publication Data

US 2022/0221001 A1    Jul. 14, 2022

(51) Int. Cl.
*F16C 27/06* (2006.01)
*F16C 33/58* (2006.01)
*F16C 19/18* (2006.01)

(52) U.S. Cl.
CPC ............ *F16C 27/066* (2013.01); *F16C 19/18* (2013.01); *F16C 33/586* (2013.01)

(58) Field of Classification Search
CPC ...... F16C 27/066; F16C 19/18; F16C 33/586; F16C 33/60; F16C 35/06; F16C 2226/60; F16C 35/073; F16C 35/077; F16F 1/38; F16F 1/3732; F16F 1/3735; F16F 15/08; F16B 5/0241; F16B 5/0258; F16B 13/0841; F16B 37/125; A61B 6/035
USPC ...................................................... 411/178
See application file for complete search history.

(56) References Cited

U.S. PATENT DOCUMENTS

| 5,982,844 | A  | * | 11/1999 | Tybinkowski | ......... | A61B 6/035 378/20 |
| 6,367,980 | B1 | * | 4/2002  | Kobayashi   | ............ | F16C 33/60 384/537 |
| 2015/0285308 | A1 | * | 10/2015 | Kanamoto    | ............ | F16C 33/605 384/504 |
| 2017/0210165 | A1 | * | 7/2017  | Kawamura    | ............ | F16C 35/06 |

OTHER PUBLICATIONS

The Rubber Washer website. https://www.casertainc.com/products/rubber-washers/ Published Sep. 27, 2020 (Year: 2020).*

* cited by examiner

*Primary Examiner* — Alan B Waits
(74) *Attorney, Agent, or Firm* — J-Tek Law PLLC; Scott T. Wakeman; Mark A. Ussai

(57) ABSTRACT

A gantry assembly includes a rotor, a stator and a bearing for coupling the rotor and the stator. The bearing includes an inner ring connected with the rotor or stator, an outer ring connected with the other one of the rotor and the stator and rolling elements between the two rings. The ring connected with the stator, preferably the outer ring, includes one or more damping washers disposed between the ring and the stator, each washer being disposed about one threaded fastener connecting the ring with the stator. Also, one or more damping cylinders are each disposed within a mounting hole of the ring connected with the stator and about a threaded fastener disposed within the hole. The bearing ring connected with the rotor may also include damping washers between the ring and the rotor or/and damping cylinders disposed within mounting holes receiving fasteners connecting the ring with the rotor.

20 Claims, 9 Drawing Sheets

US 11,592,058 B2

GANTRY ASSEMBLY BEARING WITH VIBRATION DAMPING

BACKGROUND OF THE INVENTION

The present invention relates to bearings, and more particularly to rolling element bearings for gantry assemblies.

Gantry assemblies for machines such as luggage security scanners, CT scanners, radiotherapy machines, etc. typically include a stationary frame with a central opening for receiving a patient or an object being scanned and a rotatable assembly with diagnostic, scanning or/and treatment devices which scan or radiate the object (e.g., a piece of luggage) or patient within the frame opening. Typically, the rotatable assembly is connected with the frame by a bearing assembly, such as a thin section bearing.

SUMMARY OF THE INVENTION

In one aspect, the present invention is a gantry assembly comprising a rotor rotatable about a central axis, a stator fixed with respect to the axis, and a bearing assembly rotatably coupling the rotor with the stator. The bearing assembly includes an inner ring having an outer circumferential surface providing a least one inner raceway, two opposing axial ends and at least one mounting hole extending axially into one of the two axial ends, the inner ring being connected with one of the rotor or the stator by at least one threaded fastener extending into the at least one hole of the inner ring. An outer ring is disposed about the inner ring and has an inner circumferential surface providing at least one outer raceway, two opposing axial ends and at least one mounting hole extending axially into one of the two axial ends, the outer ring being connected with the other one of the stator or the rotor by at least one threaded fastener extending into the at least one hole of the outer ring. A plurality of rolling elements are disposed between the inner and outer rings so as to roll simultaneously upon the inner and outer raceways. Further, the gantry assembly comprises at least one of: a damping washer disposed between the stator and the one of the inner and outer rings connected with the stator, the washer being disposed about the at least one threaded fastener connecting the stator with the one of the inner and outer rings or spaced circumferentially from the at least one fastener; a damping cylinder disposed within the at least one mounting hole of the one of the inner and outer rings connected with the stator and about the at least one threaded fastener extending into the hole; a damping washer disposed between the rotor and the one of the inner and outer rings connected with the rotor, the washer being disposed about the threaded fastener connecting the rotor with the one of the inner and outer rings or spaced circumferentially from the at least one fastener; and a damping cylinder disposed within the at least one mounting hole of the one of the inner and outer rings connected with the rotor and about the at least one threaded fastener extending into the hole.

In another aspect, the present invention is again a gantry assembly comprising a rotor rotatable about a central axis, a stator fixed with respect to the axis, and a bearing assembly rotatably coupling the rotor with the stator. The bearing assembly includes an inner ring connected with the rotor and an outer ring disposed about the inner ring and having two opposing axial ends and at least one mounting hole extending axially into one of the axial ends. The outer ring is connected with the stator by at least one threaded fastener extending into the at least one hole. A plurality of rolling elements are disposed between the inner and outer rings. Further, the bearing assembly includes at least one of: a damping washer disposed between the outer ring and the stator, the washer being disposed about the at least one threaded fastener connecting the outer ring with the stator or spaced circumferentially from the at least one fastener; and a damping cylinder disposed within the at least one mounting hole of the outer ring and about the at least one threaded fastener disposed within the at least one mounting hole.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
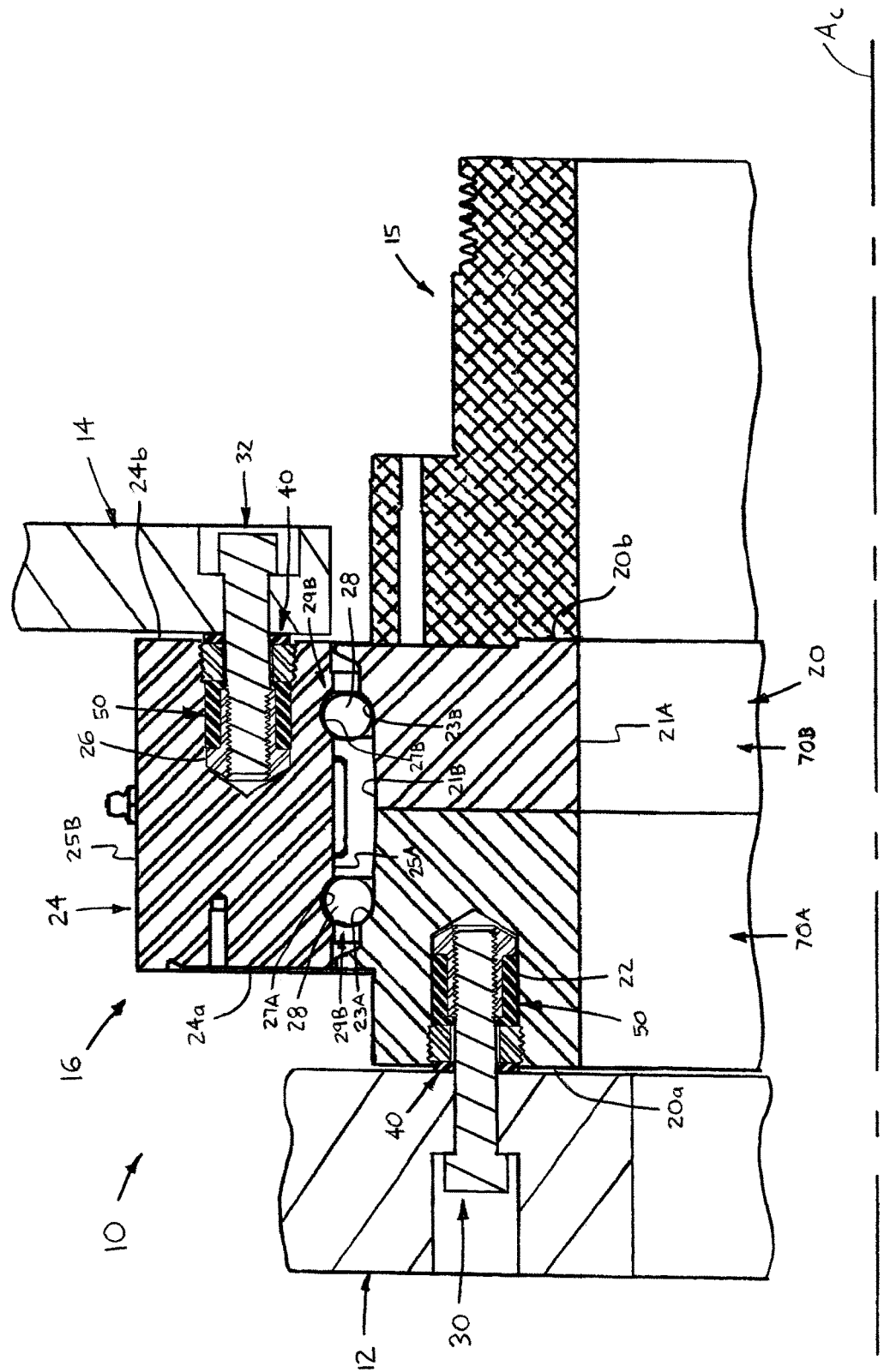
FIG. 1 is a broken-away, axial cross-sectional view of a gantry assembly in accordance with the present invention, showing a bearing inner ring connected with a rotor and a bearing outer ring connected with a stator.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a gantry assembly 10 basically comprising a rotor 12 rotatable about a central axis $A_C$, a stator 14 fixed with respect to the axis $A_C$ and a bearing 16 rotatably coupling the rotor 12 with the stator 14. Preferably, the gantry assembly 10 is part of a luggage security scanner including a rotatable drum (not shown) connected with the rotor 12, on which are mounted various imaging or scanning equipment, and a support frame (not shown) connected with the stator 14, the details of which are beyond the scope of the present disclosure. However, the gantry assembly 10 may be incorporated into a "CT" scanner (i.e., computed tomography scanner), a radiation treatment machine (e.g., external beam radiotherapy) or any other machine or device for rotating imaging or treatment equipment, or any other appropriate devices, about a central axis.

Figure 3:
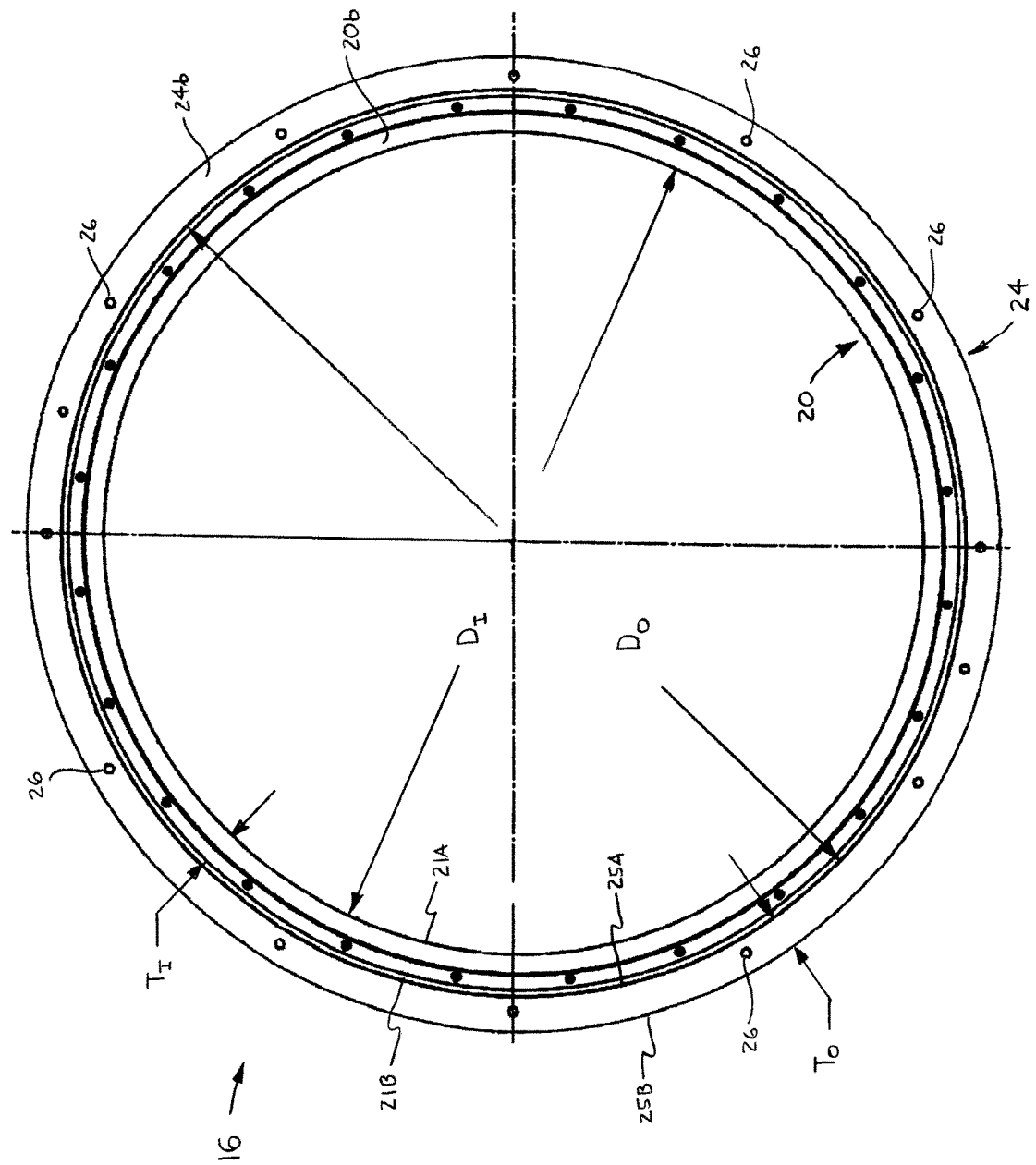
FIG. 3 is a side plan view of a bearing assembly of the present invention.
Figure 4:
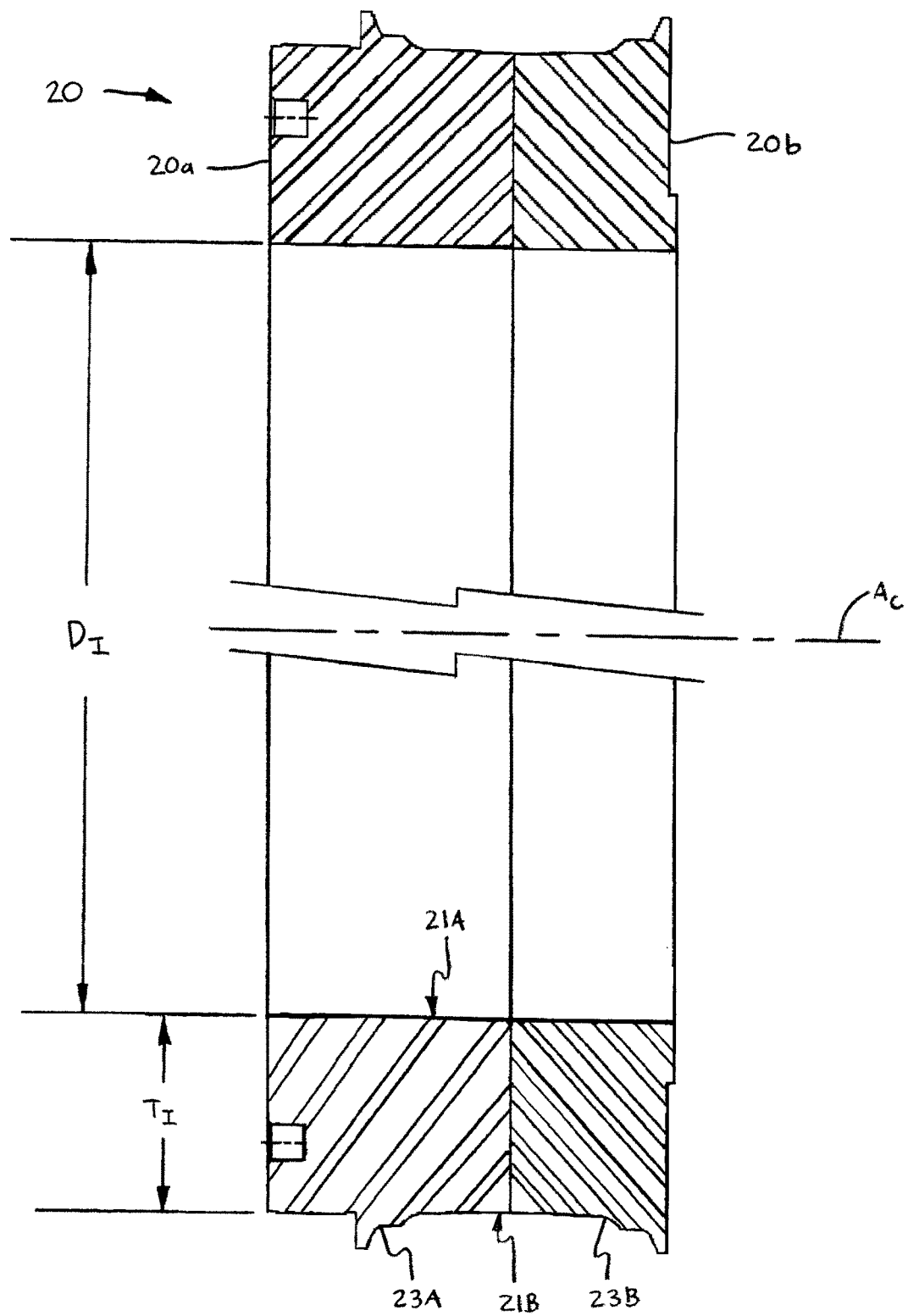
FIG. 4 is a broken-away, axial cross-sectional view of the bearing inner ring.
Figure 5:
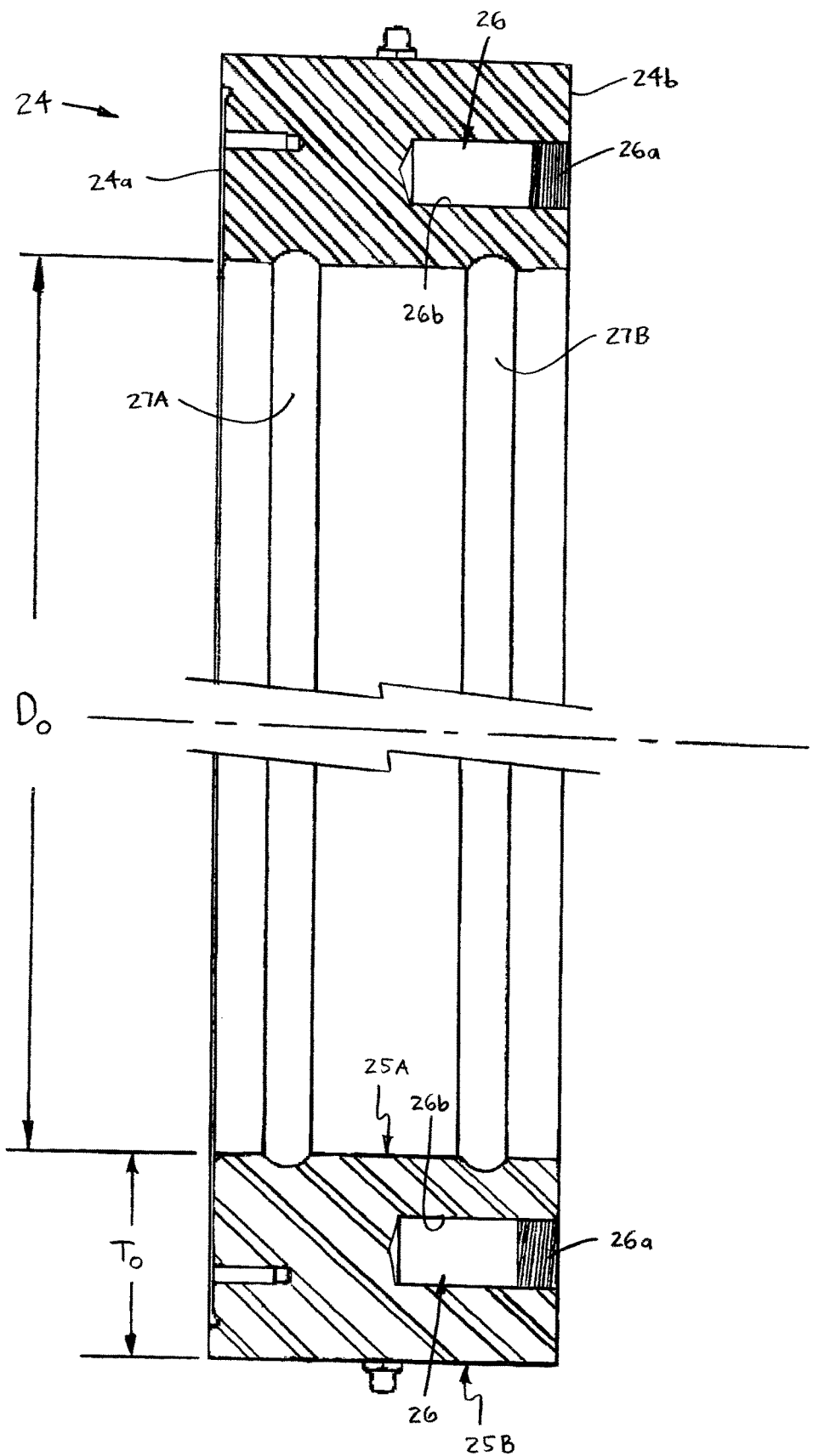
FIG. 5 is a broken-away, axial cross-sectional view of the bearing outer ring.

The bearing assembly 16 basically includes an inner annular ring 20 connected with the rotor 12 or the stator 14, an outer annular ring 24 disposed about the inner ring 20 and connected with the other one of the rotor 12 and the stator 14, and a plurality of rolling elements 28 disposed between and rotatably coupling the inner and outer rings 20, 22. Preferably, the bearing assembly 16 has relatively diametrically large and "thin" inner and outer rings 20, 24, such that a ratio of a diameter $D_I$ of the inner ring 20 to a radial thickness $T_I$ of the inner ring 20, i.e. $D_I/T_I$ as well as a ratio of a diameter $D_O$ of the outer ring 24 to a radial thickness $T_O$ of the outer ring 24, i.e. $D_O/T_O$, is each greater than 15, and preferably greater than 20, as best shown in FIG. 3. As such, the preferred bearing assembly 16 has a degree of flexibility that causes the assembly 16 to be relatively sensitive to the effects of vibration. However, the bearing assembly 16 may instead be formed in any other appropriate manner, such for example, having relatively thick or stiff inner and outer rings 20, 24, etc.

Further, the bearing ring 20 or 24 connected with the rotor 12 is preferably also connected with a drive ring 15 (FIGS. 1 and 9) drivably connected with a motor (not shown), such as by means of a belt, a gear train, etc. (none shown), shown connected with the bearing inner ring 20. As such, rotation of the drive ring 15 rotates both the bearing ring 20 or 24 and the rotor 12 about the central axis $A_C$.

More specifically, the inner ring 20 has opposing inner and outer circumferential surfaces 21A, 21B, respectively, two opposing, first and second axial ends 20a, 20b, respectively, and at least one and preferably a plurality of mounting holes 22. The mounting holes 22 extend axially into one of the two axial ends 20a, 20b and are spaced circumferentially about the central axis $A_C$, the holes 22 being shown extending into the first axial end 22a for purposes of illustration only (i.e., may alternatively extend into the second end 20b). The outer circumferential surface 21B of the inner ring 20 provides at least one and preferably two inner raceways 23A, 23B for the rolling elements 28. Further, the inner ring 20 is connected with the rotor 12 or the stator 14 by at least one threaded fastener 30 extending into the at least one mounting hole 22 of the inner ring 20, and preferably by a plurality of the threaded fasteners 30 each extending into a separate one of the preferred plurality of the mounting holes 22.

Further, the outer ring 24 has opposing inner and outer circumferential surfaces 25A, 25B, respectively, opposing first and second axial ends 24a, 24b, respectively, and at least one and preferably a plurality of mounting holes 26. The mounting holes 26 extend axially into one of the two axial ends 24a, 24b and are spaced circumferentially about the central axis $A_C$, the holes 26 being shown extending into the second axial end 24b for purpose of illustration only (i.e., may alternatively extend into the first end 24a). The inner circumferential surface 25A of the outer ring 20 provides at least one and preferably two outer raceways 27A, 27B for the rolling elements 28. Further, the outer ring 20 is connected with the stator 14 or the rotor 12 (i.e., the one not connected with the inner ring 20) by at least one threaded fastener 32 extending into the at least one mounting hole 26 of the inner ring 24, and preferably by a plurality of the threaded fasteners 32 each extending into a separate one of the preferred plurality of the mounting holes 26.

Furthermore, the plurality of rolling elements 28 are disposed between the inner and outer rings 20, 24 so as to roll simultaneously upon the inner and outer raceways 23, 27. Preferably, the bearing assembly 16 includes two sets 29A, 29B of circumferentially-spaced rolling elements 28, each disposed on a separate set of radially aligned inner and outer raceways 23A/27A and 23B/27B, but may include only a single set of rollers 28 or three or more sets of rollers 28. The rolling elements 28 are each preferably spherical rollers or balls (as shown), but may alternatively be cylindrical rollers, tapered rollers, needles, or any other appropriate type of rolling element.

Figure 2:
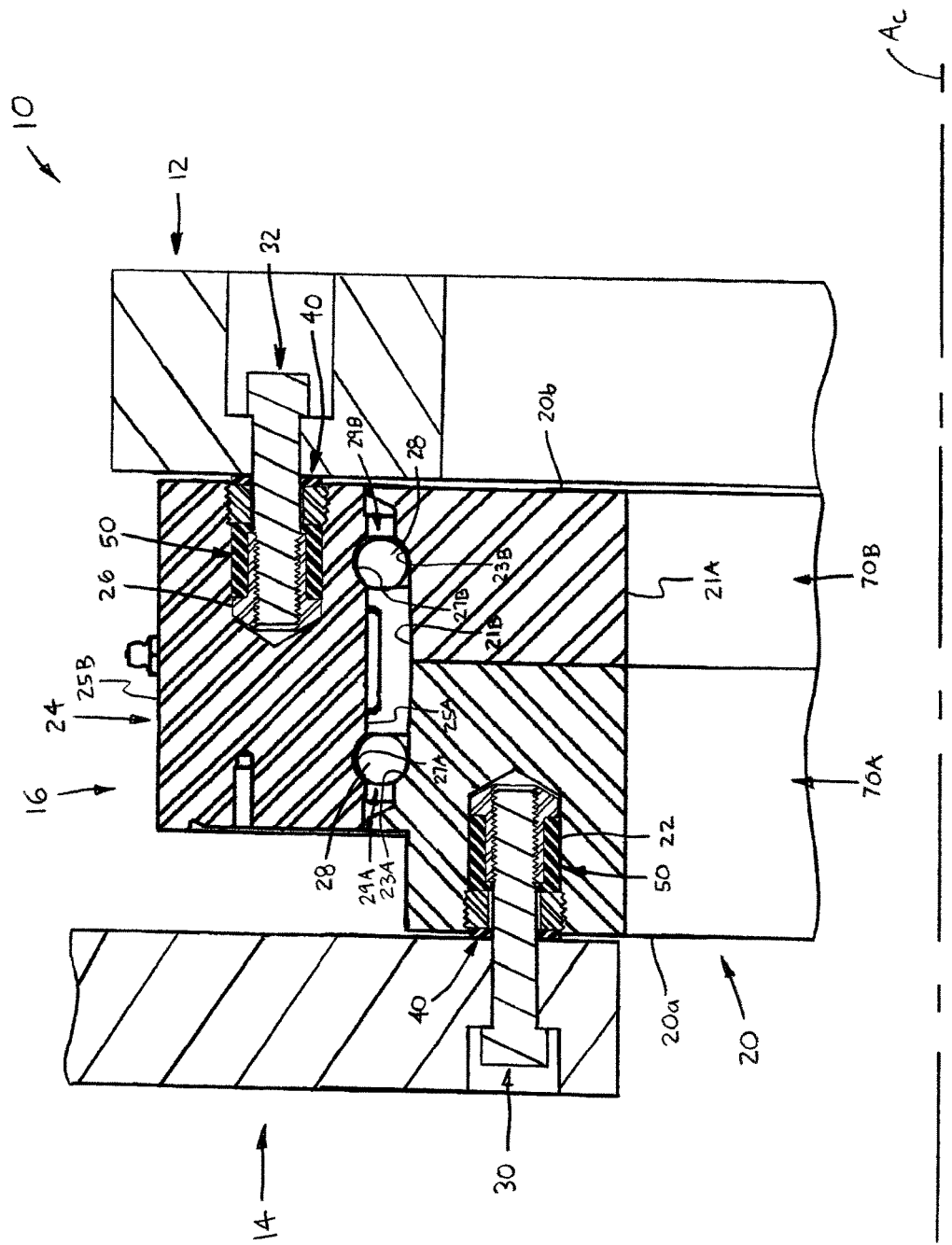
FIG. 2 is another broken-away, axial cross-sectional view of a gantry assembly in accordance with the present invention, showing a bearing inner ring connected with a stator and a bearing outer ring connected with a rotor.

Referring now to FIGS. 1, 2 and 6-8, the bearing assembly 16 further comprises at least one and preferably a plurality of dampers 40, preferably formed as damping washers 40, disposed between the stator 14 and either the inner ring 20, or the outer ring 24, connected with the stator 14. Each washer 40 is disposed about a separate one of the fasteners 30 or 32 connecting the stator 14 with the one of the inner and outer bearing rings 20, 24, preferably with the outer ring 40. Also, each washer 40 may be generally circular, generally rectangular, generally arcuate or any other appropriate shape. Additionally or alternatively, the bearing assembly 16 comprises at least one and preferably a plurality of damping cylinders 50 each disposed within a separate one of the mounting holes 22, 26 of the inner ring 20 or the outer ring 24, respectively, connected with the stator 14, and about the threaded fastener 30 or 32 extending into the hole 22, 26, respectively. Preferably, the stator 14 is connected with the bearing outer ring 24 and the bearing assembly 16 is provided with both the plurality of damping washers 40 between the stator 14 and the outer ring 24, and about each fastener 32, and the plurality of damping cylinders 50 within each mounting hole 26 and about each fastener 32 extending into the hole 26, as shown in FIG. 1. However, the stator 14 may alternatively be connected with the bearing inner ring 20 and the bearing assembly 16 may include the washers 40 between the stator 14 and the inner ring 20 and/or the cylinders 50 disposed within each mounting hole 22 and about each fastener 30, as depicted in FIG. 2.

As used herein, the terms "damping washer" and "damping cylinder" are each intended to mean a washer or cylinder formed of a material capable of absorbing and/or dissipating at least a substantial amount, and preferably a significant amount, of vibrational energy applied to the washer or cylinder, particularly materials with a relatively high damping coefficient (e.g., viscoelastic materials). Such materials include, but are not limited to elastomeric materials such as natural or synthetic rubber, polyurethane, polybutadiene, etc., or any other appropriate damping material capable of being formed into a washer or cylinder.

By providing the damping washers 40 and/or the damping cylinders 50, vibration generated by rotation of the rotor 12 and attached components is at least substantially damped (i.e., absorbed by the material of the washer 40 or cylinder 50) to prevent transmission of such vibration to the stator 14, and thus to stationary components of the gantry assembly 10. That is, the washers 40 damp and prevent axial transmission of vibration from the bearing ring 20, 24 directly to the stator 14 and the cylinders 50 prevent radial transmission of vibration from the ring 20, 24 to the stator 14 through each fastener 30 or 32.

Alternatively or additionally, the damping washers 40 and/or the damping cylinders 50 may be provided between the rotor 12 and the bearing ring 20 or 24 connected with the rotor 12. More specifically, one or more damping washers 40 may be disposed between the rotor 12 and the bearing ring 20 or 24 connected with the rotor 12, with each washer 40 being disposed about a separate one of the threaded fasteners 30 or 32 connecting the rotor 12 with the one bearing ring 20 or 24, respectively. Also, one or more damping cylinders 50 may each be disposed within a separate one of the mounting holes 22 or 26 of the ring 20 or 24 connected with the rotor 12 and about the threaded fastener 30, 32 extending into the particular hole 22, 26. As with the washers 40 and cylinders 50 at each "bolted" connection of the stator 14, the washer(s) 40 at least reduce vibrations in an axial direction within the rotor 12 and/or the cylinder(s) 50 at least reduce vibrations in a radial direction.

Figure 6:
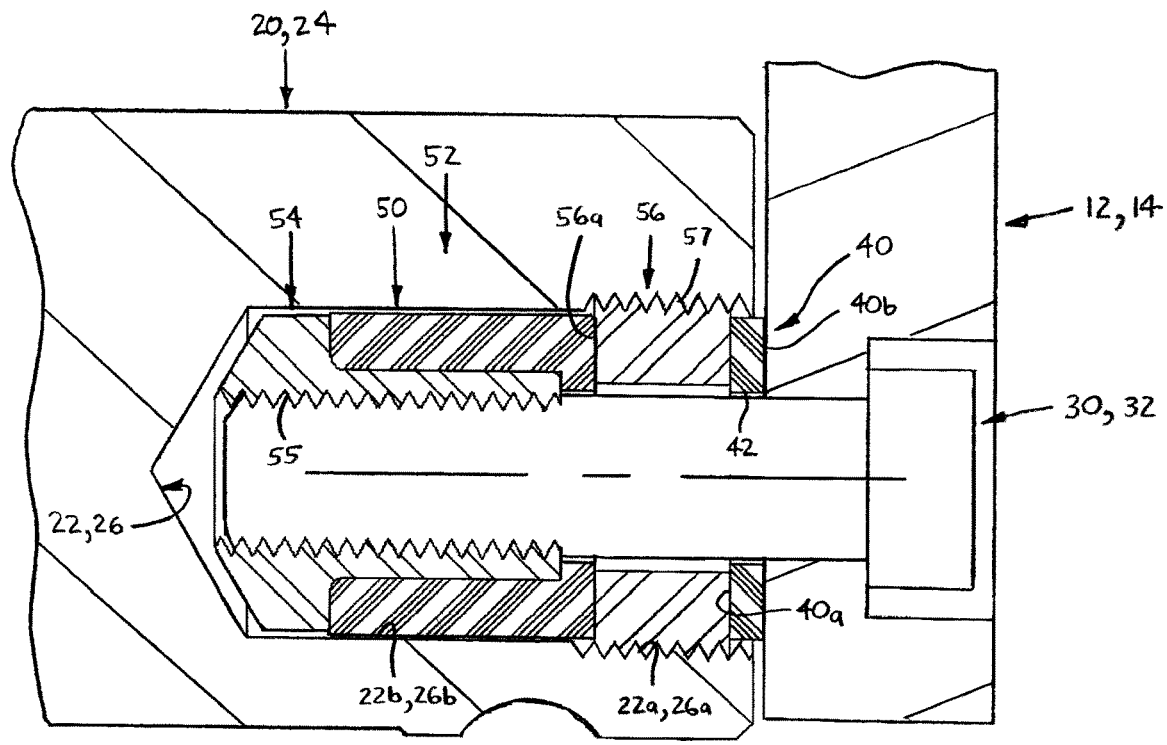
FIG. 6 is an enlarged, broken-away view of a portion of FIG. 1, showing a preferred connection assembly coupling one of the bearing rings with a portion of a stator or rotor.
Figure 7:
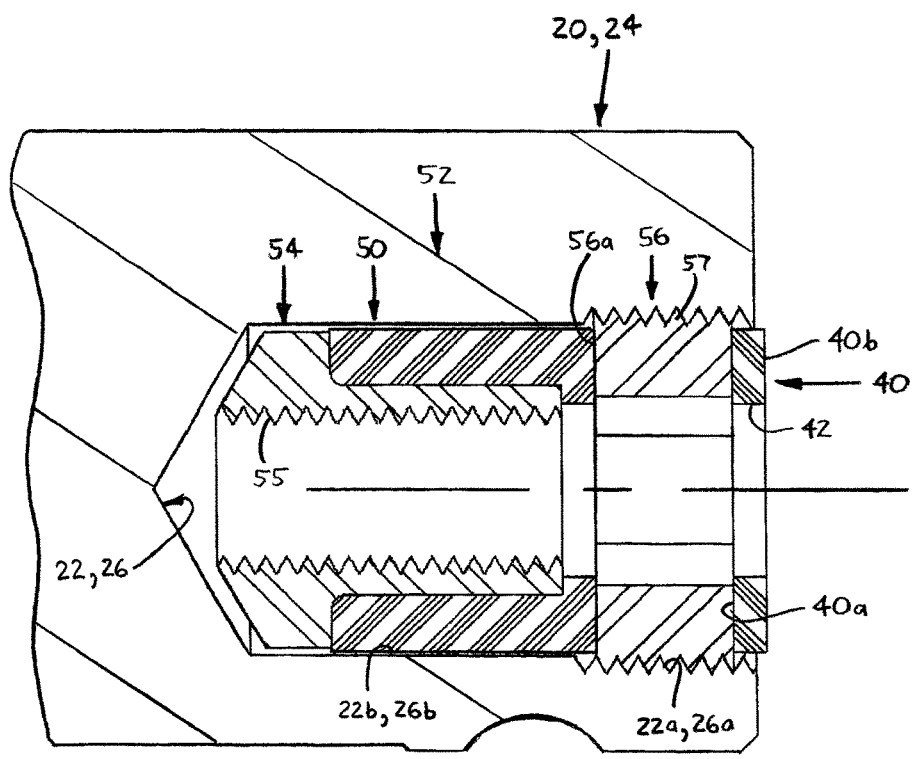
FIG. 7 is another view of the connection assembly of FIG. 6, shown without a fastener and the stator/rotor portion.
Figure 8:
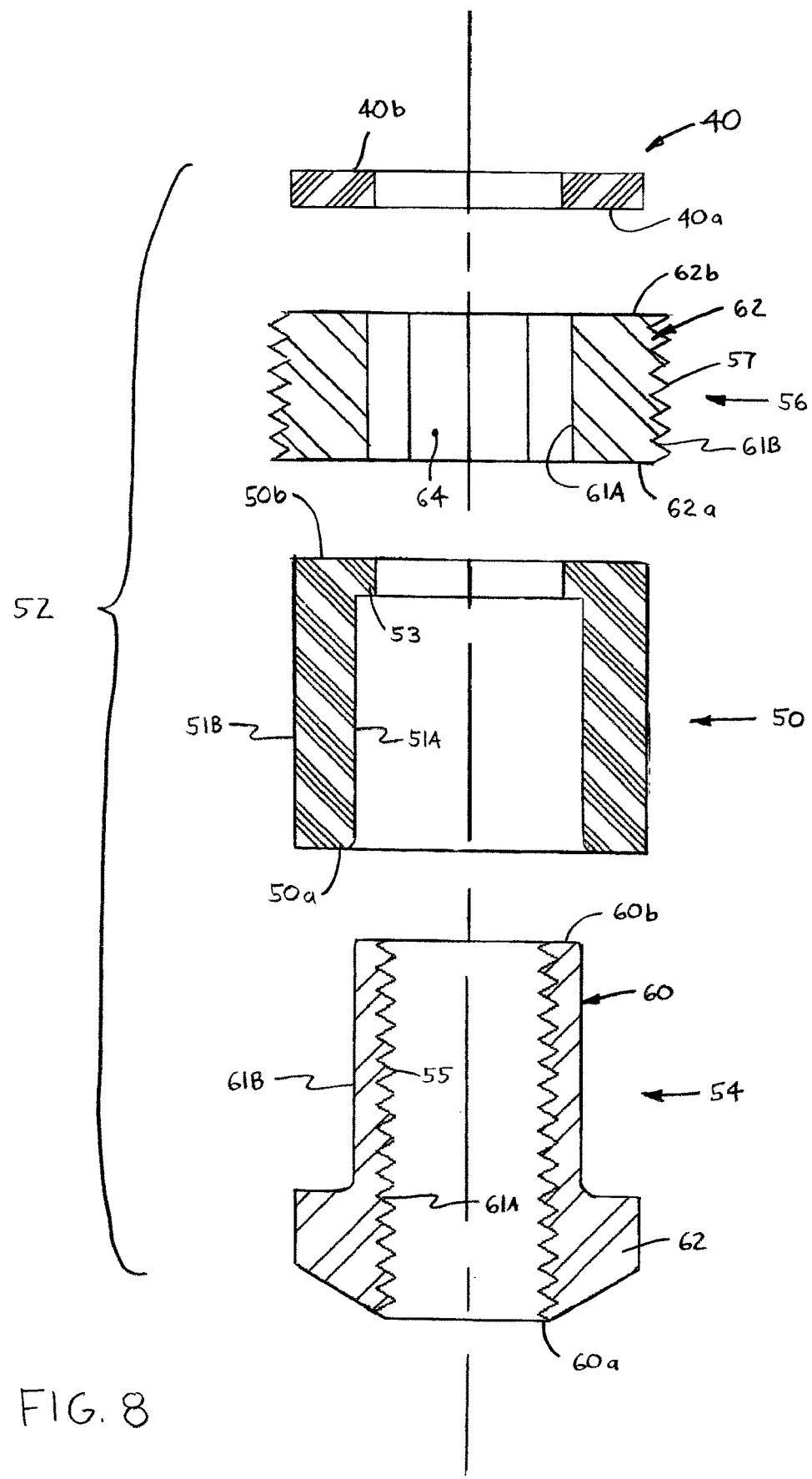
FIG. 8 is an exploded view of a preferred connection assembly.

Referring now to FIGS. 6-8, each damping cylinder 50 is preferably provided as part of a connector assembly 52 which includes the cylinder 50 and first and second inserts 54, 56, respectively, and each mounting hole 26 and/or 22 receiving a cylinder 50 includes an interior threaded section 26a, 22a, respectively. Specifically, concerning the outer ring 24, each first insert 54 is disposed within a separate one of the mounting holes 26 and has interior threads 55 threadably engaged with one fastener 32 connecting the outer ring 24 with the rotor 12 or the stator 14. The damping cylinder 50 is disposed within the mounting hole 26 and at least partially about the first insert 54. The second insert 56 is also disposed within the mounting hole 26 of the outer ring 24 and has an axial end 56a disposed against the damping cylinder 50 and has exterior threads 57 threadably engaged with the threaded section 26a of the hole 26. The second insert 56 is thereby configured to retain the damping cylinder 50 and the first insert 54 within the mounting hole 26, so as maintain the connection between the outer ring 24 and the rotor 12 or stator 14 when the first insert 54 is engaged by the fastener 32. Preferably, each insert 54, 56 is made of a metallic material, preferably steel or aluminum, but may be formed of any appropriate material capable of being provided with screw threads, such as for example, a ceramic material, a rigid polymeric material, etc.

Preferably, one of the damping washers 40 has a first axial end 40a disposed against the second insert 56, a second axial end 40b disposed against the rotor 12 or the stator 14 connected with the outer ring 24, and a central bore 42 receiving the fastener 32, i.e., the fastener 32 extends through the bore 42 of the washer 40. As such, the preferred connector assembly 52 both provides the engagement or coupling of the fastener 32 with the outer ring 24, and thus the rotor 12 or stator 14, and both damping of radial vibration through the damping cylinder 50 and damping of axial vibration by means of the washer 40.

Similarly, with regard to the inner ring 20, each first insert 54 is disposed within a separate one of the mounting holes 22 of the inner ring 20 and has interior threads 55 threadably engaged with one of the fasteners 30 connecting the inner ring 20 with the rotor 12 or the stator 14. The associated damping cylinder 50 is disposed within the mounting hole 22 and at least partially about the first insert 54. The second insert 56 is also disposed within the mounting hole 22 of the inner ring 20 and has an axial end 56a disposed against the damping cylinder 50 and has exterior threads 57 threadably engaged with the threaded section 22a of the hole 22. The second insert 56 is configured to retain the damping cylinder 50 and the first insert 54 within the mounting hole 22, so as thereby maintain the connection between the inner ring 20 and the rotor 12 or stator 14 when the first insert 54 is engaged by the fastener 30. Preferably, one of the damping washers 40 has a first axial end 40a disposed against the second insert 56, a second axial end 40b disposed against the rotor 12 or the stator 14 connected with the inner ring 20, and a central bore 42 through which extends the fastener 30.

Referring particularly to FIG. 8, each first insert 54 preferably has a generally circular cylindrical body 60 with opposing first and second axial ends 60a, 60b and a head section 62 at the first axial end 60a. The cylindrical body 60 has a threaded inner circumferential surface 61A providing the first insert interior threads 55 and an unthreaded outer circumferential surface 61B. Also, each second insert 56 preferably has a generally circular cylindrical body 62 with opposing first and second axial ends 62a, 62b, an inner circumferential surface 63A defining a bore 64, and an opposing outer circumferential surface 63B providing the second insert exterior threads 57.

Further, each damping cylinder 50 preferably has opposing first and second axial ends 50a, 50b, respectively, opposing inner and outer circumferential surfaces 51A, 51B, respectively, and a radial flange 53 extending inwardly from the second axial end 50b. The inner circumferential surface 51A of the cylinder 50 is disposed about the outer circumferential surface 61B of the first insert 54 and the outer circumferential surface 61B is disposed against the inner surface section 22b, 26b of the particular mounting hole 22, 26. Thereby, each damping cylinder 50 is sandwiched between the associated first insert 54 and the particular ring 20 or 24 to thereby damp or prevent transmission of vibrations radially between the ring 20 or 24 and the rotor 12 or the stator 14 through the associated fastener 30 or 32. Further, the first axial end 50a of each damping cylinder 50 is disposed against the head section 62 of the associated first insert body 60 and the cylinder flange 53 is disposed against the second axial end 60b of the first insert body 60 and against the first end 62a of the second insert body 62.

Figure 10:
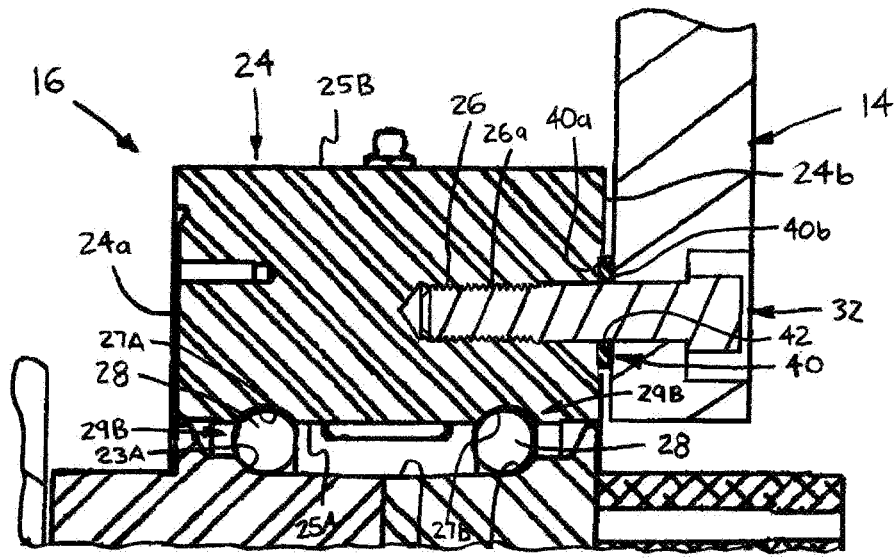
FIG. 10 is an enlarged portion of FIG. 1, showing an alternative fastener connection including a damping washer and without a damping cylinder.

Referring specifically to FIG. 10, the damping washers 40 may alternatively be provided separate from the preferred connection assembly 52, i.e., without the damping cylinders 50 and inserts 54, 56. In such a case, each fastener 32 is preferably directly threadably engaged with the associated mounting hole 26, specifically a threaded section 26a thereof. Similarly as discussed above, each washer 40 has a first axial end 40a disposed against the bearing outer ring 24 (or inner ring, not depicted), a second axial end 40b disposed against the rotor 12 or the stator 14 connected with the outer ring 24, and a central bore 42 receiving the fastener 32.

Figure 9:
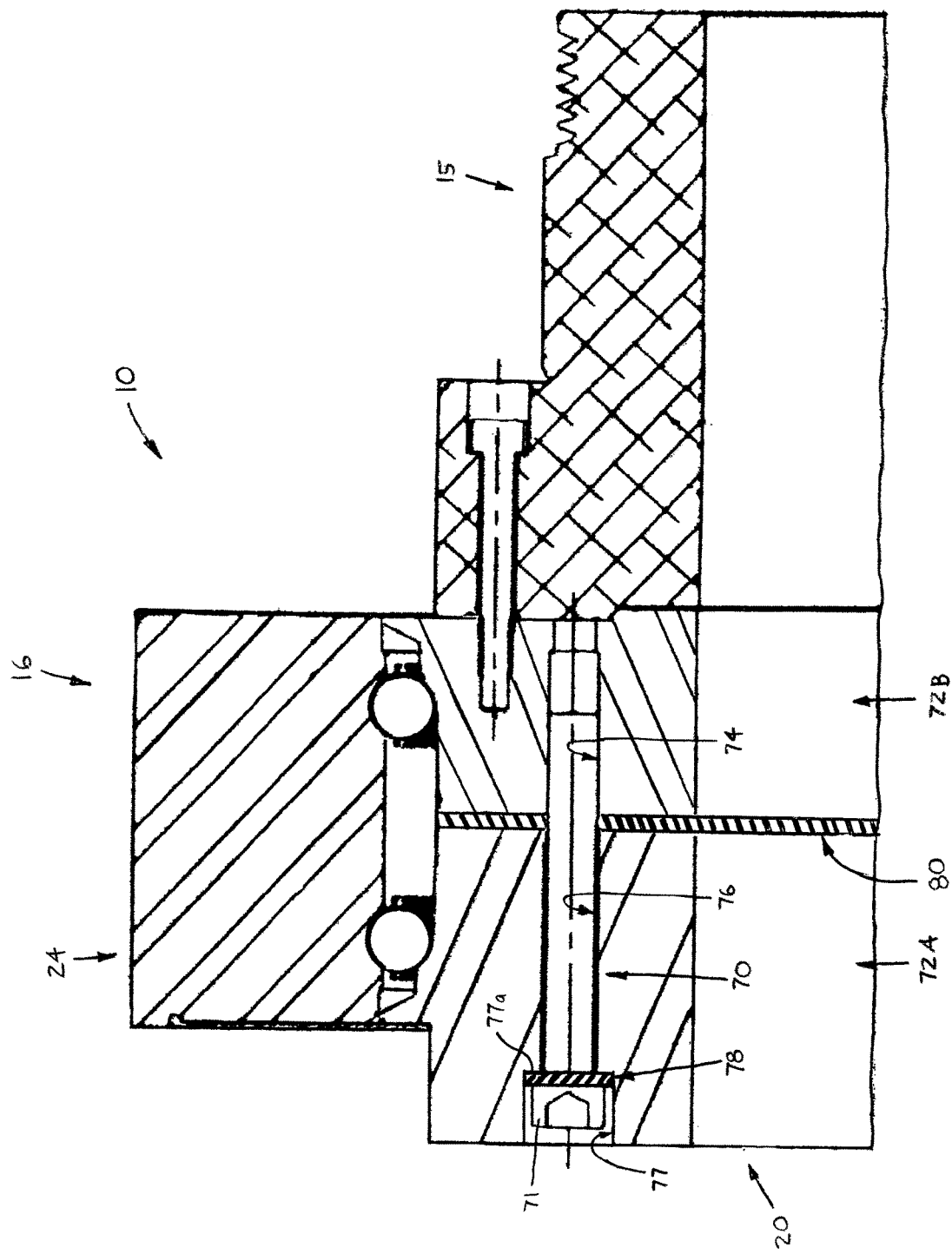
FIG. 9 is another axial cross-sectional view of the bearing assembly, taken-through a fastener connecting two preferred inner ring sections.

Referring to FIGS. 1, 2 and 9, in certain applications, particularly when the bearing assembly includes two or more sets of rolling elements 28, either the bearing inner ring 20 or the bearing outer ring 24 includes two ring sections connected together by threaded fasteners 70 (FIG. 9). In the preferred, depicted embodiment, the inner ring 20 includes first and second inner ring sections 72A, 72B, the first inner ring section 72A providing the first inner raceway 23A and the second inner ring section 72B providing the second inner raceway 23B. As shown in FIG. 9, the first inner ring section 72A has a plurality of threaded holes 74 and the second inner ring section 72B has a plurality of counterbored through-holes 76 each aligned with a separate one of the threaded holes 74 of the first inner ring section 72A. A plurality of the threaded fasteners 70 each have a head 71 and extend through a separate one of the through-holes 76 of the second inner ring section 72B and into the aligned threaded hole 74 of the first inner ring section 72A.

Referring specifically to FIG. 9, with this two-piece structure, a plurality of damping washers 78 are preferably provided. Each washer 78 is disposed within a counterbore section 77 of a separate one of the through-holes 76 so as to be located between the head 71 of the fastener 70 disposed or extending within the particular through-hole 76 and a radial shoulder surface 77a of the counterbore section 77. As a result, vibrations are absorbed by each washer 78 and thereby prevented from being transmitted between the inner ring sections 72A, 72B through the associated fastener 70. Further, an annular damping gasket 80 or a plurality of separate washers (not shown) may be provided between the first and second inner ring sections 72A, 72B to prevent vibration transmission between the two ring sections 72A, 72B, as shown in FIG. 9.

Further, although not depicted in the drawing figures, the outer ring 24 may be also be formed of two-piece construction, either alternatively to or in addition to a two-piece inner ring 20 as described above. Specifically, the outer ring 24 may include first and second outer ring sections (not shown), the first outer ring section having a plurality of threaded holes and the second outer ring section having a plurality of counterbored through-holes each aligned with a separate one of the threaded holes of the first outer ring section. A plurality of threaded fasteners having a head may extend through a separate one of the through-holes of the second outer ring section and into the aligned threaded hole of the first outer ring section, and plurality of damping washers may each be disposed within the counterbore section of a separate one of the through-holes and between the head of the fastener disposed within the through-hole and a radial shoulder surface of the counterbore section (none shown).

Figure 11:
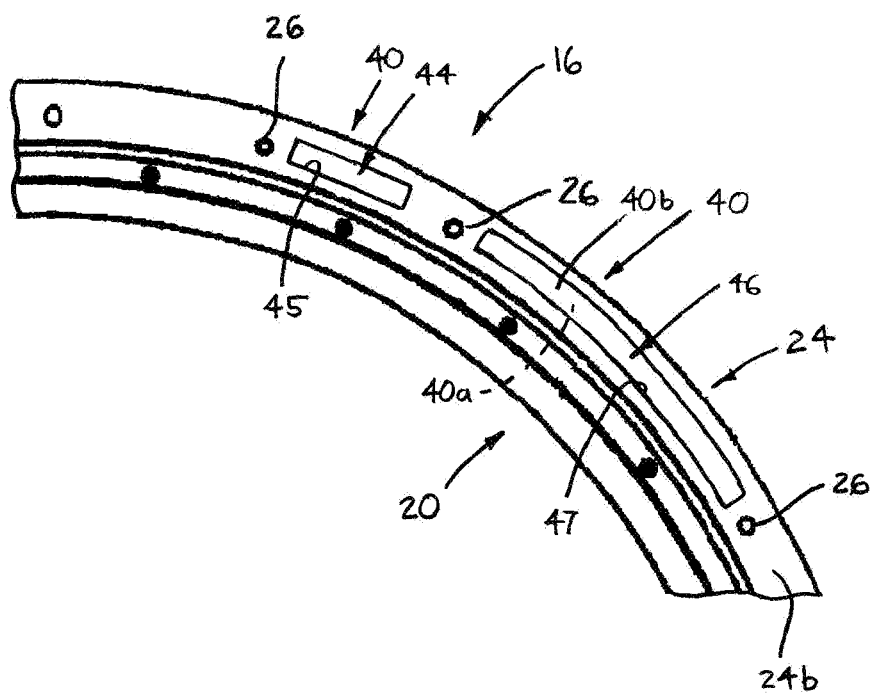
FIG. 11 is a broken-away side plan view of the bearing, showing alternative damping washers separate from the fasteners.

Referring now to FIG. 11, the dampers 40 may alternatively be provided separate from the fasteners 30 or 32 and instead be located circumferentially between each set or pair of adjacent mounting holes 26 (or holes 22). Specifically, each damper 40 may be formed having a generally rectangular body 44, a generally arcuate body 46 or with any other appropriate shape, and with a first axial end 40a disposed against the bearing outer ring 24 (or inner ring 20) and a second axial end 40b disposed against the stator 14 or rotor 12. Preferably, the bearing assembly 16 includes a plurality of the dampers 40 spaced apart circumferentially about the central axis $A_C$ such that each damper 40 is disposed circumferentially between one pair of adjacent fasteners 30 or 32. Further, each damper body 44 or 46 is preferably partially disposed within a complementary shaped pocket 45 or 47, respectively, formed in the axial end (e.g. 24b as shown) of the outer ring 24 or the inner ring 20.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A gantry assembly comprising:
   a rotor rotatable about a central axis;
   a stator fixed with respect to the axis; and
   bearing assembly rotatably coupling the rotor with the stator and including:
   an inner ring having an outer circumferential surface providing a least one inner raceway, two opposing axial ends and at least one mounting hole extending axially into one of the two axial ends, the inner ring being connected with one of the stator and the rotor by at least one threaded fastener extending into the at least one mounting hole of the inner ring;
   an outer ring disposed about the inner ring and having an inner circumferential surface providing at least one outer raceway, two opposing axial ends and at least one mounting hole extending axially into one of the two axial ends, the outer ring being connected with the other one of the stator and the rotor by at least one threaded fastener extending into the at least one mounting hole of the outer ring; and
   a plurality of rolling elements disposed between the inner and outer rings so as to roll simultaneously upon the inner and outer raceways; and;
   wherein at least one of:
      the at least one mounting hole of the outer ring has a threaded section, a first insert is disposed within the at least one hole of the outer ring and has interior threads threadably engaged with the at least one fastener connecting the outer ring with the one of the rotor and the stator, a damping cylinder is disposed within the at least one mounting hole of the outer ring and at least partially about the first insert, a second insert is disposed within the at least one mounting hole of the outer ring and has an axial end disposed against the damping cylinder and exterior threads threadably engaged with the threaded section of the mounting hole and configured to retain the damping cylinder and the first insert within the hole; and
      the at least one mounting hole of the inner ring has a threaded section, a first insert is disposed within the at least one hole of the inner ring and has interior threads threadably engaged with the at least one fastener connecting the inner ring with the one of the rotor and the stator, a damping cylinder is disposed within the at least one mounting hole of the inner ring and at least partially about the first insert, a second insert is disposed within the at least one mounting hole of the inner ring and has an axial end disposed against the damping cylinder and exterior threads threadably engaged with the threaded section of the hole and configured to retain the damping cylinder and the first insert within the hole.

2. The gantry assembly as recited in claim 1 wherein:
the at least one mounting hole of the outer ring includes a plurality of the mounting holes spaced circumferentially about the central axis, each mounting hole extending axially into the one of the two axial ends of the outer ring, and the at least one threaded fastener includes a plurality of the threaded fasteners, each threaded fastener extending into a separate one of the plurality of the mounting holes to connect the outer ring with the one of the stator and the rotor; and
a plurality of damping washers are disposed between the outer ring and the one of the stator and the rotor connected with the outer ring, each one of the plurality of washers being disposed about a separate one of the threaded fasteners connecting the outer ring with the one of the stator and the rotor connected with the outer ring or disposed circumferentially between one pair of adjacent fasteners.

3. The gantry assembly as recited in claim 1 wherein:
the at least one mounting hole of the inner ring includes a plurality of mounting holes spaced circumferentially about the central axis, each mounting hole extending axially into the one of the two axial ends of the inner ring, and the at least one threaded fastener includes a plurality of the threaded fasteners, each threaded fastener extending into a separate one of the plurality of the mounting holes to connect the inner ring with the one of the stator and the rotor; and
a plurality of damping washers are disposed between the inner ring and the one of the stator and the rotor connected with the inner ring, each one of the plurality of washers being disposed about a separate one of the threaded fasteners connecting the inner ring with the one of the stator and the rotor connected with the inner ring or disposed circumferentially between one pair of adjacent fasteners.

4. The gantry assembly as recited in claim 1 wherein at least one of:
a damping washer has a first axial end disposed against the second insert within the at least one mounting hole of the outer ring, a second axial end disposed against the one of the rotor and the stator connected with the outer ring, and a central bore, the threaded fastener extending through the central bore of the washer; and
a damping washer has a first axial end disposed against the second insert within the at least one mounting hole of the inner ring, a second axial end disposed against the one of the rotor and the stator connected with the inner ring, and a central bore, the threaded fastener extending through the central bore of the washer.

5. The gantry assembly as recited in claim 1 wherein at least one of:
the inner ring includes first and second inner ring sections, the first inner ring section having a plurality of threaded holes, the second inner ring section having a plurality of counterbored through-holes each aligned with a separate one of the threaded holes of the first inner ring section, a plurality of threaded fasteners each having a head and extending through a separate one of the through-holes of the second inner ring section and into the aligned threaded hole of the first inner ring section, and plurality of damping washers each disposed within the counterbore section of a separate one of the through-holes and between the head of the fastener disposed within the through-hole and a radial shoulder surface of the counterbore section; and
the outer ring includes first and second outer ring sections, the first outer ring section having a plurality of threaded holes, the second outer ring section having a plurality of counterbored through-holes each aligned with a separate one of the threaded holes of the first outer ring section, a plurality of threaded fasteners each having a head and extending through a separate one of the through-holes of the second outer ring section and into the aligned threaded hole of the first outer ring section, and plurality of damping washers each disposed within the counterbore section of a separate one of the through-holes and between the head of the fastener disposed within the through-hole and a radial shoulder surface of the counterbore section.

6. The gantry assembly as recited in claim 1 wherein the bearing is a thin section bearing in which a ratio of a diameter of the inner ring to a radial thickness of the inner ring and a ratio of a diameter of the outer ring to a radial thickness of the outer ring is each greater than fifteen (15).

7. The gantry assembly as recited in claim 1 wherein:
the first insert has a generally circular cylindrical body with opposing first and second axial ends, a head section at the first axial end, a threaded inner circumferential surface and an unthreaded outer circumferential surface;
the second insert has a generally circular cylindrical body with opposing first and second axial ends, an inner circumferential surface defining a bore, and outer circumferential surface providing the exterior threads; and
the damping cylinder has opposing first and second axial ends, an inner circumferential surface disposed about the outer circumferential surface and a radial flange extending inwardly from the second axial end, the flange being disposed between the second axial end of the first insert and the first end of the second insert.

8. The gantry assembly as recited in claim 1 wherein each one of the first and second inserts is formed of a metallic material.

9. A gantry assembly comprising:
a rotor rotatable about a central axis;
a stator fixed with respect to the axis; and
a bearing assembly rotatably coupling the rotor with the stator and including:
an inner ring connected with the rotor;
an outer ring disposed about the inner ring and having two opposing axial ends and at least one mounting hole extending axially into one of the axial ends, the outer ring being connected with the stator by at least one threaded fastener extending into the at least one mounting hole;
a plurality of rolling elements disposed between the inner and outer rings; and
at least one damper disposed between the outer ring and the stator, the damper being spaced circumferentially apart from the at least one fastener about the central axis.

10. The gantry assembly as recited in claim 9 wherein:
the at least one mounting hole of the outer ring includes a plurality of the mounting holes each extending axially into the one of the axial ends and the at least one fastener includes a plurality of the fasteners, each fastener extending into a separate one of the mounting holes to connect the outer ring to the stator; and the at least one damper includes a plurality of dampers, each one of the plurality of dampers is disposed circumferentially between one pair of adjacent fasteners.

11. The gantry assembly as recited in claim 9 wherein the inner ring includes: first and second inner ring sections, the first inner ring section having a plurality of threaded holes, the second inner ring having a plurality of counter bore through-holes each aligned with a separate one of the threaded holes of the first inner ring section; a plurality of threaded fasteners each having a head and extending through a separate one of the through-holes of the second inner ring section and into the aligned threaded hole of the first inner ring section; and a plurality of damping washers each disposed within the counterbore section of a separate one of the through-holes and between the head of the fastener disposed within the through-hole and a shoulder section of the counterbore section.

12. The gantry assembly as recited in claim 9 wherein the bearing is a thin section bearing in which a ratio of a diameter of the inner ring to a radial thickness of the inner ring and a ratio of a diameter of the outer ring to a radial thickness of the outer ring is each greater than fifteen (15).

13. The gantry assembly as recited in claim 9 wherein the at least one damper is one of rectangular and arcuate.

14. The gantry assembly as recited in claim 9 wherein the at least one damper has a first axial end disposed against the bearing outer ring and a second axial end disposed against the against the stator.

15. The gantry assembly as recited in claim 9 wherein the bearing outer ring has at least one pocket formed in the one of the axial ends of the bearing outer ring and the at least one damper is disposed within the pocket.

16. A gantry assembly comprising:
a rotor rotatable about a central axis;
a stator fixed with respect to the axis; and
a bearing assembly rotatably coupling the rotor with the stator and including:
an inner ring connected with the rotor and having two opposing axial ends and at least one mounting hole extending axially into one of the axial ends, the inner ring being connected with the rotor by at least one threaded fastener extending into the at least one mounting hole;
an outer ring disposed about the inner ring;
a plurality of rolling elements disposed between the inner and outer rings; and
at least one damper disposed between the inner ring and the rotor, the damper being spaced circumferentially apart from the at least one fastener about the central axis.

17. The gantry assembly as recited in claim 16 wherein:
the at least one mounting hole of the inner ring includes a plurality of mounting holes each extending axially into the one of the axial ends and the at least one fastener includes a plurality of fasteners, each fastener extending into a separate one of the mounting holes to connect the inner ring with the rotor; and
the at least one damper includes a plurality of dampers, each one of the plurality of dampers being disposed circumferentially between one pair of adjacent fasteners.

18. The gantry assembly as recited in claim 16 wherein the at least one damper is one of rectangular and arcuate.

19. The gantry assembly as recited in claim 16 wherein the at least one damper has a first axial end disposed against the bearing inner ring and a second axial end disposed against the against the rotor.

20. The gantry assembly as recited in claim 16 wherein the bearing inner ring has at least one pocket formed in the one of the axial ends of the bearing inner ring and the at least one damper is disposed within the pocket.

* * * * *